(No Model.)
3 Sheets—Sheet 1.
J. MORRIS.
HEADER PLATFORM CONNECTION.
No. 604,069.  Patented May 17, 1898.
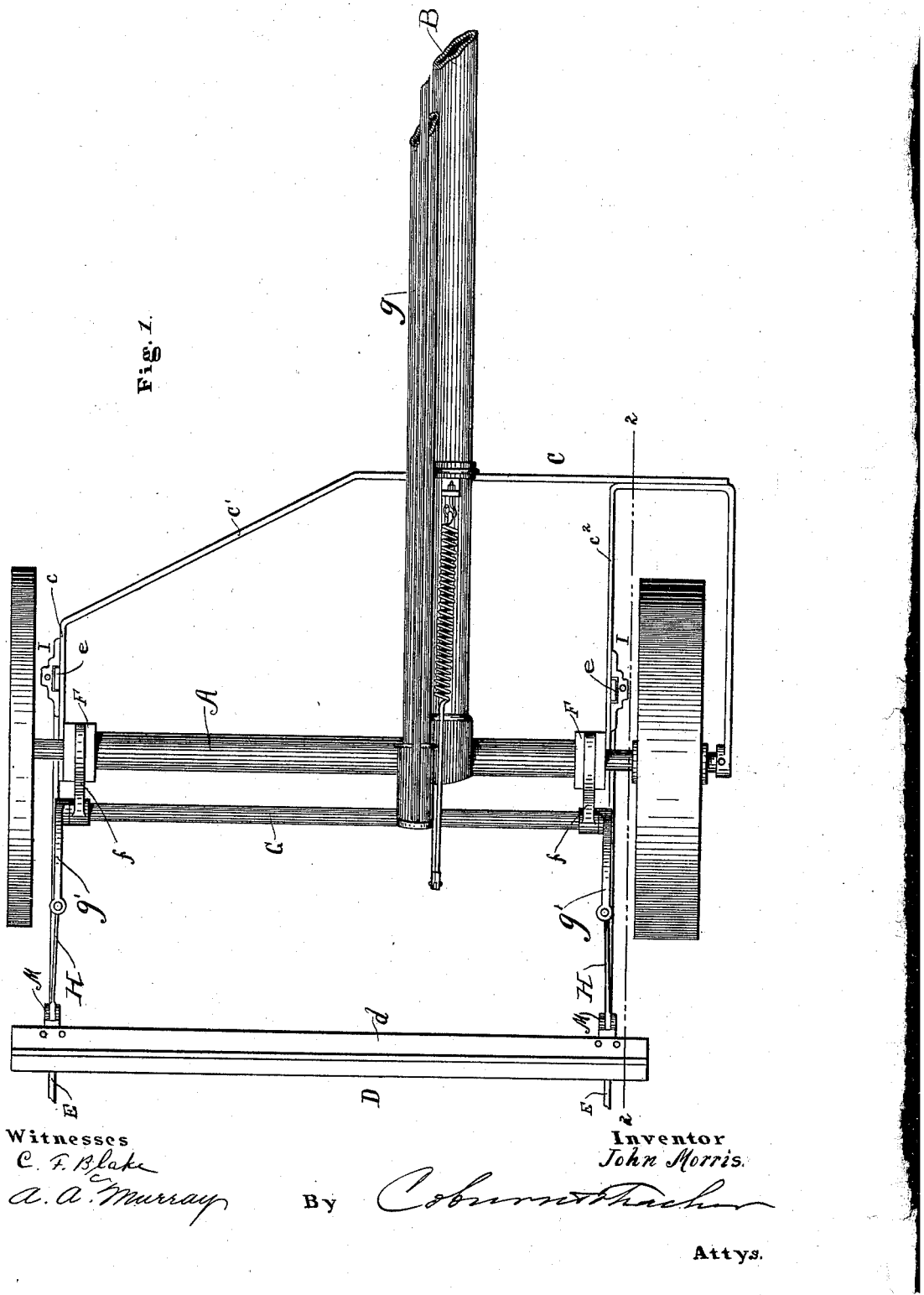
Witnesses
C. F. Blake
A. A. Murray
Inventor
John Morris.
By Coburn & Thacher
Attys.

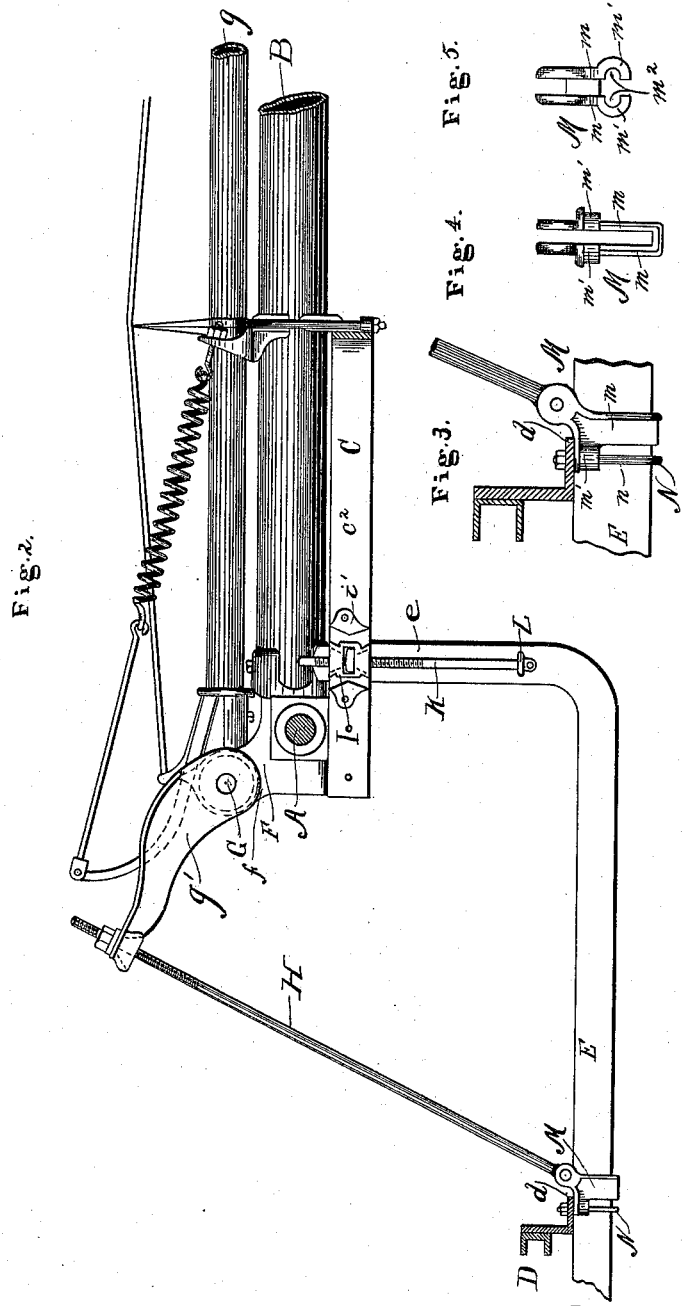

(No Model.)

3 Sheets—Sheet 3.

J. MORRIS.
HEADER PLATFORM CONNECTION.

No. 604,069.

Patented May 17, 1898.

Witnesses
C. F. Blake
A. A. Murray

Inventor
John Morris
By Coburn & Thacher
Attys.

UNITED STATES PATENT OFFICE.

JOHN MORRIS, OF WEST PULLMAN, ILLINOIS, ASSIGNOR TO THE PLANO MANUFACTURING COMPANY, OF CHICAGO, ILLINOIS.

HEADER PLATFORM CONNECTION.

SPECIFICATION forming part of Letters Patent No. 604,069, dated May 17, 1898.

Application filed February 9, 1895. Serial No. 537,802. (No model.)

*To all whom it may concern:*

Be it known that I, JOHN MORRIS, a citizen of the United States, residing at West Pullman, in the county of Cook and State of Illinois, have invented certain new and useful Improvements in Header Platform Connections, which are fully set forth in the following specification, reference being had to the accompanying drawings, in which—

Figure 6:
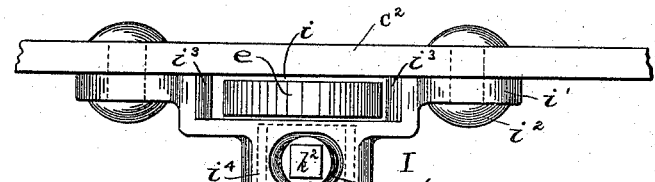
Figure 7:
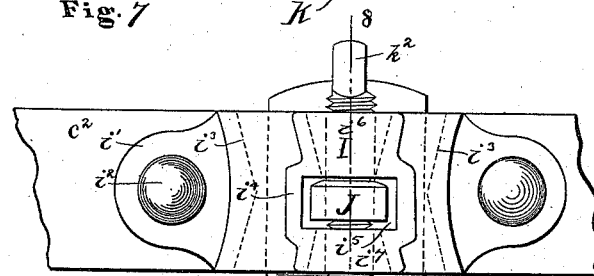

Figure 1 represents a plan view of a portion of a header embodying my invention, showing in a general way the axle, wheels, main frame, platform connections, pole, and tilting lever; Fig. 2, a vertical section of the same, taken on the line 2 2 of Fig. 1, looking from the stubble side of the machine; Fig. 3, a detail portion of Fig. 2, showing only the parts where the supporting-arm of the platform is connected with the rear sill and the tilting device; Fig. 4, an elevation of one of the stirrups for the platform-supporting arms detached therefrom; Fig. 5, a plan view of the same; Fig. 6, a detail plan showing the connection between the platform-supporting arms and the main frame; Fig. 7, a detail side elevation of the same, looking in the same direction as in Fig. 2; and Fig. 8, a vertical section of the same, taken on the line 8 8 of Fig. 7.

In the drawings, Fig. 1 is upon a scale by itself; Fig. 2, upon another and slightly-enlarged scale; Figs. 3, 4, and 5, upon one scale, but still further enlarged; and Figs. 6, 7, and 8, upon a scale by themselves, enlarged beyond all other figures of the drawings.

My invention relates to that type of grain-harvesting machine generally known as a "header," the general construction and arrangement of which are well known and no further description thereof is necessary.

The invention consists in a certain relative arrangement of the main frame, the platform and its supporting-arms, whereby the platform-supports are hinged or pivoted to the main frame in rear of the axle, the particular joint device by means of which the platform-supporting arms are connected to the main frame, and in the device by means of which the platform-sills are attached to the platform-supports and through the latter to the tilting rod or shaft. As my invention relates only to these parts of the machine, it is not necessary to show or describe the entire machine. Therefore I have only shown in the drawings those few parts of the machine which are necessary to a full understanding of the construction and operation of my entire invention. All other parts of the machine are omitted from the drawings and will not be described.

I disclaim as of my invention any of the parts of a complete header which are not here shown and also some of the features which are here shown only for the purpose of illustrating the connection and operation of my improvements, as will be hereinafter pointed out.

In the drawings, A represents the axle of a header, B the thrust pole or tongue secured thereto, and C the main frame, which is secured to the axle and pole. The sills D are represented by only one illustration—the rear sill—which is secured to the supporting arms or bars E of the platform. Brackets F are secured to the axle, and on them is mounted a rock shaft or rod G, the direct bearing-supports of this rod being arms $f$, extending forward somewhat from the axle. The tilting lever $g$ is fixed to the rock-shaft, and the latter is provided with crank-arms $g'$, which are connected by link-rods H with the platform or its supporting-arms or line-levers by joints which permit the tilting of the platform by the oscillation of the rock-shaft.

The parts mentioned above are not my invention in their general features of construction and arrangement and are only given here and referred to for the purpose of properly illustrating the improvements which do constitute the subject-matter of the invention intended to be here presented.

I will now describe in detail the specific features of the machine in which my present invention is embodied with only such reference to those features mentioned above in a general way as may be required to understand the operation. It is well understood in these header-machines that the platform must be supported so as to be tilted or adjusted to accommodate different lengths of grain. This requires some kind of hinge connection between the platform and stationary or fixed support to which it is connected and which may be the main frame or some other suitable part of the machine. So far as this mode of supporting the platform is concerned the main feature of my improvement is the arrangement and location of the connecting joints or pivots between the platform and its fixed support or carrier in rear of the axle.

Another and second feature of the improvement is the construction and arrangement of the mechanism by which the platform-supporting arms or line-levers may be raised and lowered vertically in relation to the main frame, thereby effecting a similar adjustment of the platform by a corresponding adjustment of the connecting link-rods H, jointed to the tilting-lever shaft. This will be seen from the drawings, in which, as already stated, C represents the main frame or a portion thereof. As here shown, the bars or beams of this frame are secured to the axle and extend in rear thereof, being connected at the extreme rear to the pole. The supporting-arms or line-levers E of the platform are carried back underneath the axle and bent upward at their rear ends to provide upright sections or standards $e$, which are connected at their upper ends to the main frame by hinge or pivot joints at the respective ends of the machine. These joint connections are made at some distance in rear of the axle, as seen in Fig. 1, thereby carrying the fulcrum-support or center of motion for the platform to the rear of the axle, thus distributing the weight of the platform upon the axle both in rear and in front of the latter and to some extent balancing this weight on the axle.

The main frame (shown in Fig. 1) consists of a short end bar or beam $c$ at the grain side of the machine, a long rear bar $c'$, extending rearward and inward from the said end bar underneath the pole and secured at its outer end to a loop $c^2$, which embraces the rear portion of the main wheel and is mounted at its front end on the axle, this particular construction of frame, however, being here shown simply for illustration and not being claimed as an improvement invented by me.

Figure 8:
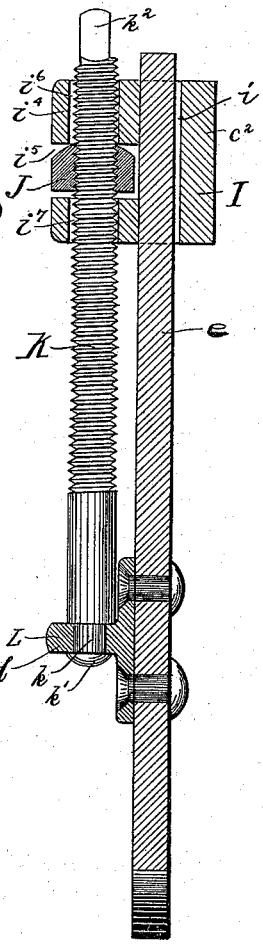

The main features of the invention have been stated above. The purpose or object of these features of construction and connection of the platform line-levers with a fixed support—in this instance, the main frame—is to distribute more evenly the strains on the platform supporting and tilting mechanism, as this greatly lessens the strains on the link-rods H and their connection to the platform-supporting arms or line-levers. A further purpose is to provide for a greater range of tilting movement in the guards or fingers and sickle, accompanied by a correspondingly less angular tilt or movement of the platform, and consequently of the elevator connected therewith, by reason of the greater distance obtained between the sickle and the pivoting-points of the platform. So far as this feature of improvement is considered in a general way the particular construction of the pivotal or hinge joints is not an essential or controlling element; but I have devised a joint connection for this purpose of special construction which is particularly adapted to the location and which will now be described. This device is designed to allow the swinging or vibrating movement of the arms required for tilting the platform and also to provide for vertical adjustment of these arms. For this purpose a bracket I is constructed of special form to receive and hold the upright section $e$ of the line-levers or platform-supports. This bracket is of metal and in general form is like a plate of greater length than width, the latter dimension being substantially the same as the width of the main frame-bar, so that it is adapted to be applied and secured to one side of this bar. One face of the bracket is plain, except that a wide channel $i$ is cut down across it. This is the inner face and adapted to fit the side of the main frame-bar, thereby closing the said channel when the bracket is applied to the frame-bar and secured thereto, as seen in Figs. 2 and 3. For the purpose of securing the bracket to the bar the former has short ears $i'$ at its respective ends, through which bolts or rivets $i^2$ are passed to fasten the bracket to its support. The respective edges $i^3$ of the channel $i$ are made with inclinations backward from the center in each direction, as seen in Figs. 2 and 7, or these edges may be convex or circular. This construction provides for the swinging or vibrating movement of the upright section, which is required in tilting the platform. This movement of the upright section is perfectly free, and to better secure the result desired the shortest distance between the channel edges is somewhat greater than the width of the said section or standard, as seen in Fig. 7. The operation will be obvious from examination of Figs. 2 and 7 of the drawings, it being understood, of course, that the vibration is occasioned by the operation of the tilting lever in the usual way to raise and lower or tilt the platform. Of course it is necessary to provide means also for securing the upright sections or standards $e$ in position at the connection between them and the main frame, and it is also desirable to provide for the vertical adjustment of these parts. To effect this, the bracket I on its outer or front face is constructed with an enlargement or rib $i^4$, running up and down the bracket centrally and about midway of its length, having a rectangular opening $i^5$ extending outward from the channel described above entirely through the said rib. The construction of the opening $i^5$, described above, provides a kind of socket or partly-inclosed space, having a straight seat, which is designed to receive and accommodate a metallic rectangular nut J, adapted to be placed in the said space. A rod K is provided of a size corresponding with the aperture in the nut and is constructed with an exterior thread nearly its entire length, by which it is fitted to the nut. The rib on the front of the bracket in which this nut is seated when in working position is also constructed, as shown in the drawings, with vertical apertures $i^6$ $i^7$, extending, respectively, from the central transverse opening $i^5$ upward and downward to the respective edges and each widening or flaring slightly from the said central recess outward to the respective edges, as indicated in dotted lines in Figs. 2 and 7. These inclines are preferably parallel with those of the channel edges $i^3$, described above and as indicated by dotted lines in Fig. 7. This construction is to provide for the oscillation of the rod K with the upright section or standard of the line-lever already explained, and if the latter edges are convex or circular, a modification suggested above, these edges in the rib are preferably of corresponding contour. As these edges in the rib-opening are to accommodate the round rod K, they are preferably made slightly concave, as indicated in Fig. 6, and the dimension of the upper opening $i^6$ at its lower extremity is about the same as that of the said rod, while the corresponding portion of the lower opening $i^7$ is somewhat larger than said rod, as seen in Fig. 7. This construction is to accommodate the swinging of the said rod, which of course must conform to the corresponding movement of the line-lever. The lower end of the rod K is secured to the section $e$ near its lower end, and it will be seen that the seat of the nut being fixed the turning of the rod therein will raise and lower this section $e$, according to the direction in which the rod is turned, by reason of the threaded connection between nut and rod. The connection between the lower end of the rod and the supporting-arm or line-lever must therefore be such as to allow the free turning of this threaded rod. Any suitable device for this purpose may be employed; but, as shown in the drawings, it consists of a small bracket L, fastened to the side of the supporting-arm and having a horizontal lug or projection $l$, perforated to accommodate the said rod, which passes through it loosely and at its lower end is not necessarily threaded. The lower extremity of the rod is cut down slightly, thereby forming a short section $k$, reduced in size to fit the perforation in the lug $l$, the annular face at the lower extremity of the normal or full size of the rod resting on the upper side or face of the lug $l$, as seen in Figs. 7 and 8. The lower end of the rod is secured to the bracket in which it is mounted by a rivet-head $k'$ or any other suitable device, a headed screw setting into a threaded seat in the lower end of the rod, for instance. The upper end of the rod K is provided with an angular head $k^2$ for the application of an ordinary crank or wrench by which it may be turned.

The provision for the vibration or swinging of the upright sections of the line-levers has already been pointed out. It will be obvious from an examination of the drawings, especially Fig. 2, that the thrust on these upright sections of the line-levers is upward, for of course by far the greater weight of the platform portion of the structure is in front of the pivotal points where the connecting-rods H are hinged or pivoted to the line-levers, and as these connecting-rods are stiff this extra weight in front of the said pivots will operate to thrust the upright sections of the line-levers upward in their ways as far as possible. The limit of this upward thrust is determined by the nut on the rod K, which will be forced up against the upper face of the rectangular recess, in which it is arranged, as seen in Figs. 7 and 8. The nut is preferably rounded upon its upper surface, as is also indicated in Figs. 7 and 8, thereby facilitating the vibration or lateral turning of the nut on its seat to accommodate the swing of the line-lever and threaded rod described above. The relative construction of the upper and lower openings or apertures in the bracket-rib described above provides sufficient space for the swinging movement of the threaded rod, just explained, so as to allow for the free tilting of the platform, as required in actual operation, and the curved or rounded upper and bearing surface of the nut facilitates this movement.

Obviously the platform is adjusted bodily for its normal working position by means of the nuts on the rods K and the nuts or other devices on the link-rods H. There is thus provided a joint connection between the platform-supports and the main frame, which allows the required tilting of the platform and at the same time permits an easy vertical bodily adjustment of the latter, as may be required.

The connecting-bracket between the platform-supporting arms and the main frame may be mounted on either side of the beams or bars of the latter. I prefer, however, the outside, which is the arrangement shown in the drawings, as seen in Fig. 1, in which the said brackets are shown applied to their respective supports, on the outer faces thereof—that is, on the face next or looking to the grain at the grain end of the machine and looking toward the stubble at the opposite or stubble end of the machine.

Another feature of my invention is the device by means of which the tilting lever is connected to the platform or its supporting-arms and the two latter are also united. Reference has already been made to the main connecting device which unites these two parts—viz., the link-rods H—a disclaimer being made, however, to these rods and the rock-shaft to which they are connected. The present improvement relates to the device by means of which these rods are connected at their lower ends to the supporting-arms E of the platform and said arms are also united to the sills. This device is a divided or loop-shaped stirrup M, the two arms $m$ of which are joined at one end, which may be called the "bottom" of the stirrup, and are separated or open at their upper ends, so that between the arms there is a free narrow space which is adapted to receive and inclose one of the platform-supporting arms E. At the front edge of each arm of the stirrup there is also a short projecting lug $m'$, about midway of the arm and extending directly in front thereof on each side of the said supporting-arms when in place. These two lugs are widened or rounded out somewhat to increase their size for vertical grooves or perforations $m^2$ to receive the respective arms of a U-bolt N, which is adapted to receive and embrace a supporting-arm E, while each of its members $n$ may be passed up through one of the perforated lugs $m'$ on the main stirrup M. The rear platform-sill D, of angle-iron, is shown in the drawings, and the horizontal web $d$ of this sill extends rearward and is perforated to permit the passage of the two free ends of the U-bolt. The U-bolts therefore embrace the respective platform-supporting arms, and thus secure them to the platform also, because the sills are fastened to the supporting-arms. The upper extremities of the stirrup-arms $m$ are perforated horizontally, and the lower ends of the link-rods H are pivoted thereto, thus providing the link-joints required for the tilting of the platform. This device provides a very firm and secure connection between the platform and its supporting-arms, which also furnishes convenient means for making a hinge connection between the link-rods and the platform to provide for the tilting of the latter without weakening the said supporting-arms or line-levers at the points where greatest strength is needed.

The principal objects and results of my invention have been stated above, and it must be evident that this construction produces a very desirable and valuable header, for the platform may be raised and lowered vertically or tilted upon its pivotal connections without throwing the elevator out of desirable and operative position into one where it may come edgewise in contact with the wagon-rack or grain-receptacle.

There may be changes in the specific devices here shown and described without losing the main features of construction which have been set forth above, and such mechanical changes are contemplated in the building of headers for actual use without losing these important main features of the header.

Having thus described my invention, what I claim to be new, and desire to secure by Letters Patent, is—

1. In a header-harvester, the axle, in combination with a stationary frame carried thereby, a bracket, I, provided with a channel, $i$, in one side, having suitable, outwardly-flaring edges, $i^3$, platform-supporting arms, E, provided with upright terminals, $e$, corresponding substantially in width to the narrowest part of the channel and adapted to fit loosely therein, and a hinge or pivot connecting device uniting the platform support and bracket, substantially as described.

2. In a header-harvester, a main or stationary frame, C, in combination with brackets, I, secured to the respective end bars of the frame and provided with a transverse channel, $i$, in one side and flaring at each end, and an enlargement or rib, $i^4$, on its outer face, having a recess or socket therein, platform-supporting arms, E, having upright terminals, $e$, adapted to fit and move in the channels in the brackets, nuts, J, adapted to be seated in the said bracket-supports respectively, and threaded rods, K, loosely connected at their lower ends to the platform-supporting arms and passing up thence through apertures, prepared therefor in the brackets, and the perforated nuts threaded to fit the said rods, substantially as described.

3. In a header-harvester, a stationary frame, C, in combination with a bracket, I, adapted to be secured to the respective end bars or arms of the frame, provided with a transverse channel in the side next to the frame-bar, flaring at each end, a side socket, $i^5$, extending outward from said channel, and apertures, $i^6$, $i^7$, above and below said socket, platform-supporting arm, E, the extremity, $e$, of which is adapted to fit and slide loosely in the channel between the bracket and the main frame, a nut, J, adapted to fit loosely in the socket and having a threaded perforation, a bracket, L, fastened to the arm E, below the bracket I, and provided with a projecting perforated lug, $l$, and a connecting-rod, K, passing loosely through the perforation in the bracket L, and provided with an enlargement or head on the under side of the latter, threaded to fit the perforation in the nut J, and passing up through the latter and the apertures, $i^6$, $i^7$, in the bracket I, being of less diameter than the latter to permit a limited lateral vibration, substantially as described.

4. In a header-harvester, the platform-supporting arms, E, in combination with a divided or loop-shaped stirrup, M, adapted to embrace the respective platform-arms and fit up against the under edge thereof, the platform-sill, D, of angle-iron with its horizontal web extending over projections on the stirrup, a fastening device passing through suitable ways in the stirrup and sill-web and connecting them to the platform-support or line-lever, and link-rods pivoted at their lower ends to the upper ends of the stirrups and at their upper ends connected to the tilting mechanism of the harvester, substantially as described.

5. In a header-harvester, platform-supporting arms, E, in combination with divided or loop-shaped stirrups, M, adapted to embrace the said arms respectively and provided with vertically-perforated projecting lugs, $m'$, angle-iron platform-sill, D, the horizontal web, $d$, of which is fitted over the said projecting lugs, U-bolts, N, adapted to embrace the line-levers and pass up through the respective stirrup-lugs and the horizontal web of the sill, nuts, or other fastening device, applied to the upper ends of said bolts, and link-rods, H, hinged at their lower ends to the upper ends of the stirrups M and connected at their upper ends to the tilting device of the machine, substantially as described.

6. In a header-harvester, platform-supporting arms, E, having upright extremities, $e$, in combination with brackets, I, secured to the respective ends of the main frame and having transverse side channels flaring at each end, vertical ribs or enlargements, $i^4$, on the outside of said brackets, having horizontal sockets, $i^5$, therein and apertures, $i^6$, $i^7$, running out upwardly and downwardly from said socket, the lower one somewhat wider than the upper, a threaded rod, K, connected at its lower end to the line-lever or platform-supporting arm, extending up thence through the vertical openings and socket of the rib $i^4$ and of a diameter substantially the same as the lower or inner diameter of the upper aperture, but less than the diameter of the lower aperture, and a nut, J, arranged in said socket and also receiving the threaded rod as it is passed up through the openings in the rib by turning it in said nut, substantially as described.

JOHN MORRIS.

Witnesses:
  A. A. MURRAY,
  I. A. HELMICH.